United States Patent
Lykkegaard (10) Patent No.: US 8,502,422 B2
(45) Date of Patent: Aug. 6, 2013

(54) SORTING SYSTEM WITH LINEAR SYNCHRONOUS MOTOR DRIVE

(75) Inventor: Uffe Lykkegaard, Århus (DK)

(73) Assignee: Crisplant a/s, Århus N (DK)

( * ) Notice: Subject to any disclaimer, the term of this patent is extended or adjusted under 35 U.S.C. 154(b) by 767 days.

(21) Appl. No.: 12/595,483

(22) PCT Filed: Apr. 16, 2008

(86) PCT No.: PCT/DK2008/050088
§ 371 (c)(1),
(2), (4) Date: Mar. 2, 2010

(87) PCT Pub. No.: WO2008/125122
PCT Pub. Date: Oct. 23, 2008

(65) Prior Publication Data
US 2010/0176663 A1 Jul. 15, 2010

(30) Foreign Application Priority Data

Apr. 16, 2007 (DK) .................................. 2007 00553
Dec. 18, 2007 (DK) .................................. 2007 01807

(51) Int. Cl.
*H02K 41/03* (2006.01)
*B65G 54/02* (2006.01)

(52) U.S. Cl.
USPC ....................... 310/12.25; 310/12.11; 198/805

(58) Field of Classification Search
USPC .......... 310/12.11, 12.08, 12.15, 12.24, 12.25; 198/370.06, 805, 619, 370.04
See application file for complete search history.

(56) References Cited

U.S. PATENT DOCUMENTS

| 4,792,036 A | 12/1988 | Heidelberg |
| 5,172,803 A | 12/1992 | Lewin |
| 5,199,548 A | 4/1993 | Tanaka et al. |
| 5,907,200 A * | 5/1999 | Chitayat .................... 310/12.24 |
| 5,947,361 A | 9/1999 | Berger et al. |
| 5,977,664 A * | 11/1999 | Chitayat .................... 310/12.24 |

(Continued)

FOREIGN PATENT DOCUMENTS

| DE | 26 29 162 A2 | 1/1978 |
| DE | 197 18 269 A1 | 11/1998 |

(Continued)

OTHER PUBLICATIONS

Beumer Maschinenfabrik GmbH & Co. Kg "2D E Tray Sorter with contactless energy supply" www.beumer.com.

*Primary Examiner* — Tran Nguyen
*Assistant Examiner* — Leda Pham
(74) *Attorney, Agent, or Firm* — Knobbe Martens Olson & Bear LLP (57) ABSTRACT

The present invention relates to a sorting system including a conveyor comprising a plurality of carts for carrying articles, in particular for sorting articles such as parcels and baggage. The conveyor has a linear synchronous motor drive system with stators arranged along a track which the carts follow. Reaction elements are mounted on each of the carts. The reaction elements each comprise an even or an uneven number of permanent magnets arranged on a plate-like carrier. The magnets on reaction elements of adjacent carts are arranged to form arrow of magnets with alternating polarity, said row having two neighboring magnets. At least one of the two neighboring magnets has a reduced dimension in the transport direction, and the two neighboring magnets are situated at a transition between adjacent carts.

34 Claims, 9 Drawing Sheets

U.S. PATENT DOCUMENTS

| | | | |
|---|---|---|---|
| 6,025,658 A * | 2/2000 | Kamata | 310/12.21 |
| 6,398,016 B1 | 6/2002 | Maeder et al. | |
| 6,595,328 B1 | 7/2003 | Ishino et al. | |
| 6,799,672 B2 | 10/2004 | Wood | |
| 6,938,750 B2 | 9/2005 | Miller et al. | |
| 6,971,507 B2 | 12/2005 | Forman | |
| 7,121,400 B2 | 10/2006 | Fandella | |
| 7,134,396 B2 | 11/2006 | Ramu | |
| 7,422,099 B2 | 9/2008 | Reguzzi | |
| 7,597,188 B2 | 10/2009 | Volpi | |
| 7,857,297 B2 | 12/2010 | Ong | |
| 2004/0108185 A1 * | 6/2004 | Hishinuma | 198/370.06 |
| 2006/0011093 A1 * | 1/2006 | Jensen et al. | 104/282 |
| 2008/0100152 A1 * | 5/2008 | Busch | 310/14 |

FOREIGN PATENT DOCUMENTS

| | | |
|---|---|---|
| DE | 197 43 882 A1 | 4/1999 |
| DE | 198 29 052 C1 | 12/1999 |
| EP | 0 957 051 A1 | 11/1999 |
| EP | 1 043 830 B1 | 6/2004 |
| GB | 2 165 515 A | 4/1986 |
| WO | WO 00/01059 | 1/2000 |
| WO | WO 2004/011351 A2 | 2/2004 |
| WO | WO 2006040098 A1 * | 4/2006 |

\* cited by examiner

SORTING SYSTEM WITH LINEAR SYNCHRONOUS MOTOR DRIVE

CROSS REFERENCE TO RELATED APPLICATIONS

This application claims the benefit and priority to and is a U.S. National Phase Application of PCT International Application Number PCT/DK2008/050088, filed on Apr. 16, 2008, designating the United States of America and published in the English language, which is an International Application of and claims the benefit of priority to Danish Patent Application No. PA 2007 00553, filed on Apr. 16, 2007, and Danish Patent Application No. PA 2007 01807, filed on Dec. 18, 2007. The disclosures of the above-referenced applications are hereby expressly incorporated by reference in their entireties.

FIELD OF THE INVENTION

The present invention relates to a sorting system including a conveyor comprising a plurality of carts for carrying articles, in particular for sorting articles such as parcels and baggage. The conveyor has an electric linear synchronous motor drive system.

BACKGROUND OF THE INVENTION

Automatic sorting of articles, such as baggage, packets and parcels and the like has in recent years become increasingly advantageous. Most national and international parcel delivery services and mail services today operate large distribution centres wherein automatic or semiautomatic sorting of parcels according to their destination is performed. Similarly, many baggage handling systems, such as for example for airports, use automatic sorting systems. An important part of such baggage handling or parcel sorting centres is a conveyor for automatically moving the articles to the desired location in the distribution centre appropriate for the given destination.

Sorting systems typically have a number of carts/article supporting units driven by a transport mechanism. An article in the form of e.g. a parcel or baggage is placed on a cart and driven round a track by the transport mechanism. When the article reaches the appropriate location for the given destination, the article is loaded off the track. Typically, the loading of the article on and off the cart is automatic, for example by moving an article supporting surface in a direction perpendicular to the conveying direction or by a tipping motion by the platform/article supporting surface supporting the article.

One such sorting system is known from WO 2004/011351, which has a number of carts moving along a track. A propulsion system for the conveyor comprises a stationary stator which has a coil assembly. In addition the carts have a reaction element comprising a plurality of permanent magnets mounted on a ferromagnetic carrier plate thereby providing magnetic fields. A controller controls the supply of electrical power to the coil assembly such that a travelling-wave magnetic field is generated which interacts with those of the permanent magnets to provide a driving force.

Another known system having a magnetic drive system is shown in U.S. Pat. No. 4,792,036. It relates to a transporting device of the conveyor belt type in which a transporting belt, on which the material to be transported can be supported, is capable of being moved along a transport path by a driving mechanism and carried using rolling bodies. The transport path is equipped with an electrical travelling-wave stator. Permanent magnets are arranged in series which interact with the transporting belt in a power-transmitting fashion and form a linear motor with the travelling-wave stator with an air-gap between the pole faces of the attracting permanent magnets and the travelling-wave stator.

SUMMARY

It may be seen as an object of the present invention to provide an improved sorting system. It may also be seen as an object to provide a sorting system with improved energy utilisation and efficiency having the benefit of reduced energy consumption. It may furthermore be seen as an object to provide a sorting system with improved performance when running along curves and/or along ramps and descents. Other objects appear from the description and the appended figures.

One aspect of the invention involves a sorting system including a conveyor comprising a plurality of carts for carrying articles, a track along which the carts may be driven, a propulsion system for providing a driving force to the carts for moving the carts along the track, said propulsion system comprising at least one stationary stator having a plurality of coils arranged to generate magnetic fields when electrical power is applied, and reaction elements mounted on each of the carts, said reaction elements each comprising a plurality of permanent magnets connected to at least one plate-like carrier, and said reaction elements being arranged on the carts in order to interact with the magnetic fields generated by the coils of the stator, as well as a controller for controlling a supply of electrical power to the stator in order to provide a driving force via the reaction elements to the carts when power is applied, where the reaction elements each comprises a number of permanent magnets arranged with alternating polarity, and where the magnets on reaction elements of two adjacent carts are arranged to form a longitudinal row of magnets as seen in a transport direction of the carts, said row having two neighbouring magnets, at least one of said two magnets having, in the transport direction, a reduced dimension compared to other magnets of the reaction element, said two neighbouring magnets being located at each side of a transition between said two adjacent carts.

The reaction elements on adjacent carts are hence arranged as one almost continuous reaction element with a row of magnets with alternating polarity, and which row is interrupted only by at least one of two neighbouring magnets having a reduced dimension in the transport direction at each side of the transition between the carts. Therefore, a maximum number of magnets are available on each cart, and in total, to interact with the travelling-wave magnetic fields. Moreover, use of the stationary stator or stators is optimised, because the travelling-wave magnetic fields may have a maximum number of coils and/or a maximum surface area of stator poles interacting with the magnets. When controlling the travelling-wave magnetic field the controller only has to take the magnets with the reduced dimensions at the transitions between the carts into account, or may even ignore the magnets with the reduced dimensions. The travelling-wave magnetic fields may include alternating fields generated by all the coils of the stator. Or, where only a coil in question, which at the time is in a position where a magnet with a reduced dimension is situated, may at such time be provided with a reduced current or even turned off and not used. These factors lead to improved energy utilisation and efficiency. As sorter systems typically operate continuously over long periods, this efficiency improvement results in significant cost saving.

The plate-like carriers may be arranged in a horizontal position on the carts and the at least one stationary stator may be arranged to interact with the reaction elements from a position below the reaction elements. This facilitates that the stators may be built into the track and placed out of the way.

The plate-like carriers may also be arranged in a vertical position on the carts and at least one stationary stator may be arranged to interact with the reaction elements from a position situated sideways to the reaction elements. This facilitates that the stators may be built into the side of the track.

The plate-like carriers may further be arranged in a vertical position on the carts and at least two stationary stators may be arranged to interact with the reaction elements from opposite positions situated sideways to the reaction elements. This is preferred to having the stators interact with the reaction element from one side only, due to the induced sideway forces. However, care must be taken to ensure that undesired objects are not trapped between the oppositely arranged stators, which may cause a system failure.

The plate-like carrier may comprise ferromagnetic material which is arranged to lead a magnetic field from at least one permanent magnet to another permanent magnet. This may depend on the actual arrangement of the magnets on the carrier relative to the stators to improve the energy efficiency since the magnetic field is lead with a more reduced loss through ferromagnetic material than through air. The plate-like carrier may be made from an iron or steel plate.

A preferred embodiment involves that the surface of the permanent magnets has an extent of from 40 to less than 50 millimeters in a longitudinal direction of the cart. The magnets may be arranged with a pitch of 50 millimeters or about 50 millimeters. Any other magnet to magnet pitches may also be chosen, e.g. 25, 30, 35, 40, 45, 55, 60, 65, 70, 75 or 100 millimeters, as long as the magnet to magnet pitch is the same on each cart. The extent of the magnets shall preferably correspond to the pitch or slightly less in order to maximise the strength of the magnetic fields.

Another preferred embodiment involves that a cart to cart pitch of consecutive carts is a natural number of hundreds of millimeters. This works very well with a pitch from magnet to magnet in the reaction elements of about 50 millimeters. A natural number of hundreds of millimeters is convenient for adapting the size of the carts to the articles which are to be sorted. The pitch of consecutive carts is preferably selected from a group comprising 100, 200, 300, 400, 500, 600, 700, 800, 900, 1000, 1100, 1200, 1300, 1400, 1500, 1600, 1700, 1800, 1900 and 2000 millimeters, which covers typical articles which are sorted, such as parcels and luggage. With a magnet to magnet pitch different from 50 millimeters may a different cart to cart pitch be selected accordingly.

The carts may preferably form an endless chain of carts. For an endless chain, the driving forces can be applied to any suitable carts and there is no need for special consideration of the beginning or end of a succession of carts. Stators may be arranged in suitable positions along the track. When the carts form an endless chain, it is possible to make the sorter system with only one stator. However, in order to enable a more smooth and constant propulsion, it is preferred to use a plurality of stators arranged along the track.

In a further embodiment of the system the controller may comprise an encoder for determining a position and a speed of one or more carts, or one of a train of carts, or one of an endless chain of carts. The controller may control the electrical power applied to the coil assembly in response to the determined position and/or speed. Preferably, the encoder is placed in connection with a stator such that when a position and/or a speed of a cart is detected, this is used to synchronise the travelling-wave magnetic field of the stator with the magnetic fields of the permanent magnets. Specifically, the location determination can be used to set a phase of the frequency of the electrical supply creating the travelling-wave magnetic field, and the speed can be used to set the frequency of the electrical supply creating the travelling-wave magnetic field.

Another aspect of the invention involves a cart for a sorting system, the cart comprising a frame structure, at least one magnetic reaction element comprising an uneven and plural number of permanent magnets mounted equidistantly on a at least one plate-like carrier, where the cart comprises linking means for connection to another cart, and where the reaction element, when the cart is connected to an identical cart to form two adjacent carts, the magnets on the reaction elements of said two adjacent carts are forming a row of magnets having alternating polarity, said row having at least one magnet having a reduced dimension compared to other magnets of the reaction element.

According to a possible aspect of the invention, both said at least two neighbouring magnets, in the transport direction, have a reduced dimension compared to other magnets of the reaction element. Thereby, it is possible to further increase the different possibilities of re-arranging the two neighbouring magnets, however still maintaining a certain pitch, either a certain centre-to-centre pitch or a certain side-to-side pitch, of the two neighbouring magnets on each side of the transition between carts.

According to one possible embodiment according to the invention, the reduced dimension is present only in the transport direction, not in a direction transverse to the transport direction. This is the case of the embodiments shown in the detailed description of the invention, where the dimension is reduced only by diminishing the magnets to approximately half the dimension of the other magnets by using magnets having approximately half the dimension in the transport direction the carts.

According to one possible embodiment according to the invention, where the reduced dimension is present both in the transport direction and in a direction transverse to the transport direction. This is not the case of the embodiments shown in the detailed description of the invention. However, the dimension may alternatively or additionally be reduced by diminishing the magnets to a smaller 'thickness' than the other magnets. By using magnets having a smaller 'thickness', the dimension non-parallel with the transport direction will be diminished along at least part of the neighbouring magnets.

According to one possible embodiment of the invention, the at least one of the two neighbouring magnets, in the transport direction, has a smaller rectangular shape compared to the other magnets having a relatively larger rectangular shape. This is the case of the embodiments shown in the detailed description of the invention, where the dimension is reduced by diminishing the magnets to approximately half the dimension of the other magnets by using magnets having approximately half the dimension in the transport direction, i.e. in the transport direction of the carts.

According to another possible embodiment of the invention, the at least one of the two neighbouring magnets, in the transport direction, has an at least partly oval shape along at least a part of the magnet, said at least partly oval shape facing the other of the two neighbouring magnets. By using one or both magnets having an oval shape along at least a part of the magnet, the dimension will be diminished along at least part of one or both of the neighbouring magnets. However, it is possible that one or both magnets still have a size larger than e.g. half the size of the other magnets of the reaction element of each cart.

According to another possible embodiment of the invention, the at least one magnet of the two neighbouring magnets, in the transport direction, has a semi-circular disc shape along at least a part of the magnet, said semi-circular disc shape facing the other of the two neighbouring magnets. By using one or both magnets having a semi-circular shape along at least a part of the magnet, the dimension will be diminished along at least part of one or both of the neighbouring magnets. However, it is possible that one or both magnets still have a size larger than e.g. half the size of the other magnets of the reaction element of each cart.

According to another possible embodiment of the invention, the at least one of the two neighbouring magnets, in the transport direction, has an at least partly tapering shape along at least a part of the magnet, said at least partly tapering shape facing the other of the two neighbouring magnets. By using one or both magnets having a tapering shape along at least a part of the magnet, the dimension will be diminished along at least part of one or both of the neighbouring magnets. However, it is possible that one or both magnets still have a size larger than e.g. half the size of the other magnets of the reaction element of each cart.

According to another possible embodiment of the invention, the at least one of the two neighbouring magnets, in the transport direction, has a wedge-like shape along at least a part of the magnet, said wedge-like shape facing the other of the two neighbouring magnets. By using one or both magnets having a wedge-like shape along at least a part of the magnet, the dimension will be diminished along at least part of one or both of the neighbouring magnets. However, it is possible that one or both magnets still have a size larger than e.g. half the size of the other magnets of the reaction element of each cart.

According to another possible embodiment of the invention, the at least one of the two neighbouring magnets, in the transport direction, has a point-like shape along at least a part of the magnet, said point-like shape facing the other of the two neighbouring magnets. By using one or both magnets having a point-like shape along at least a part of the magnet, the dimension will be diminished along at least part of one or both of the neighbouring magnets. However, it is possible that one or both magnets still have a size larger than e.g. half the size of the other magnets of the reaction element of each cart.

BRIEF DESCRIPTION OF THE DRAWINGS

FIG. 12a-16b show different embodiments of end magnets on reaction elements.

DETAILED DESCRIPTION

The figures are merely included as information given as examples to a skilled person of how the invention may be carried out.

Figure 1:
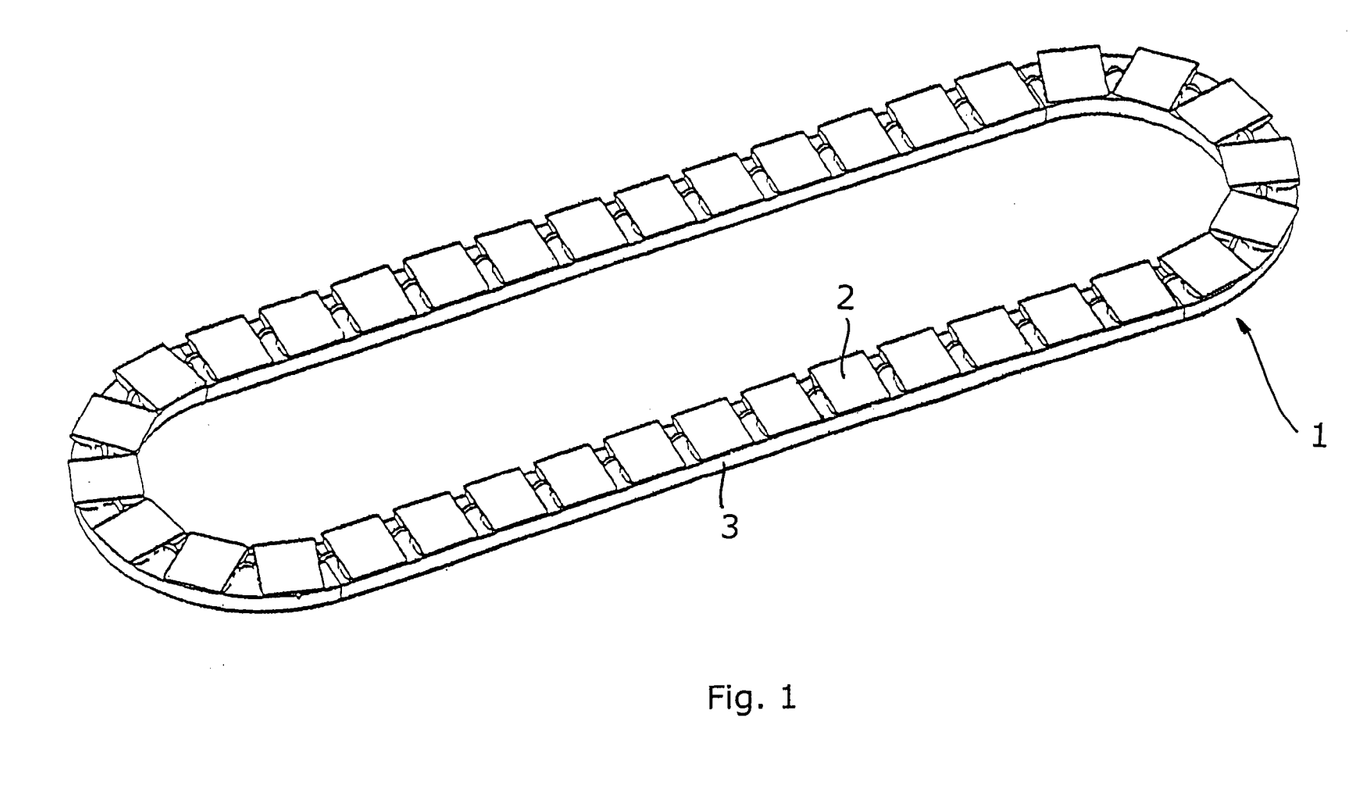
FIG. 1 shows a generalised depiction of a sorter system.

FIG. 1 displays a sorter system 1 which is suitable for carrying loads. The sorter system 1 comprises a track 3 along which the carts 2 move. The track 3 is shown as an oval track in FIG. 1, but in various embodiments it will be laid out to suit the local conditions and requirements. It may be kilometers long and include a number of turns, which may be both sideways as well as upwards and downwards. Along the track 3 is placed not shown induction stations for loading articles onto the carts as well as not shown discharge stations where loaded articles are discharged. A number of carts 2 move along the track for transporting articles from the not shown induction stations to the discharge stations. Each of the carts 2 has a load bearing platform on which an article to be transported is placed. The load bearing platform may be of any of the known types, such as cross-belt or tilt tray, or any other type.

The carts 2 are interconnected by linking means 18 shown in FIGS. 3a, 3b, 5a, 5b, 7a and 7b, and which is maintaining a fixed distance between the carts 2, and ensuring that the movement of a cart 2 is transferred to an adjacent cart by a pulling or pushing action. The carts 2 may form a train including two, three, four or five carts, or dozens of carts, or any number of carts. Or, as shown in FIG. 1, the carts 2 may form an endless chain covering the entire length of the track 3.

The sorting system according to the invention may be used as a parcel sorting system for a parcel distribution centre, and the loads carried by the conveyor are parcels of different sizes and weights. In another embodiment it may be used in a baggage handling system, and the loads carried are baggage, such as suitcases. Also, the sorting system may be used for distribution of articles in a ware house. The articles, baggage or parcels are automatically loaded to the load bearing platforms of the carts by e.g. a suitable conveyor belt or lifting apparatus. They are then transported to the appropriate location along the track where the article, baggage or parcel is automatically unloaded from the load bearing platform of the cart 2.

Figure 2:
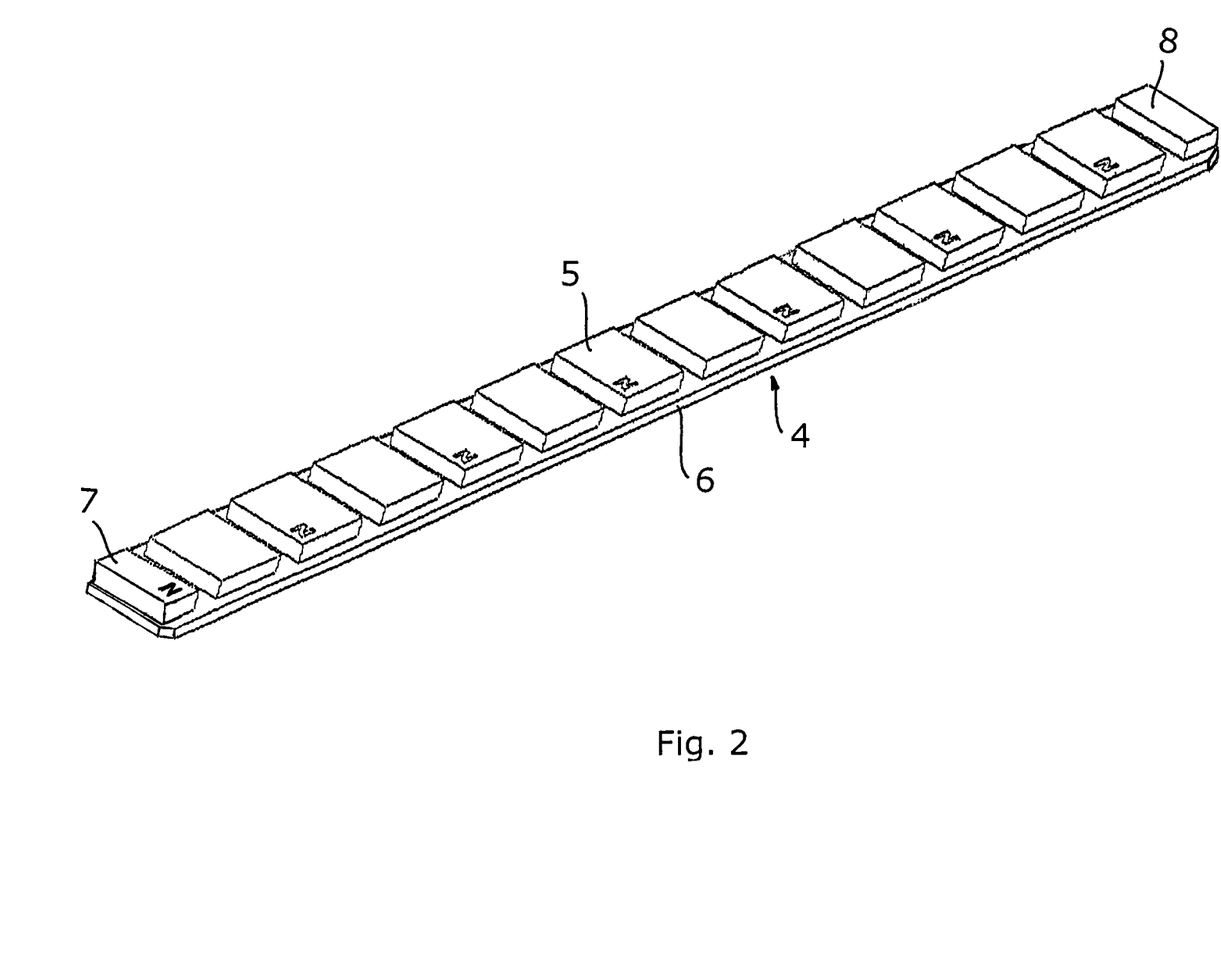
FIG. 2 shows a reaction element according to one embodiment of the invention

FIG. 2 illustrates a reaction element 4 according to one embodiment of the invention. The reaction element 4 comprises a plate-like carrier 6 on which a plurality of permanent magnets 5, 7, 8 is fixed. The plate 6 may be divided into sections for easier handling, or so as to divide the reaction element into modules. The permanent magnets 5, 7, 8 are arranged with alternating polarity. The permanent magnet 7 in one end of the reaction element 4 has a magnetic north pole facing upwards, and the permanent magnet 8 in the opposite end of the reaction element 4 has a magnetic south pole facing upwards.

The number of magnets is even, such as 4, 6, 8, 10, 12, 14, etc. The even number of permanent magnets of a reaction element from one end of said reaction element starts with a magnetic north pole and ends with a magnetic south pole, but may as well start with a magnetic south pole and end with a magnetic north pole. Reaction elements on two adjacent carts start and end with magnets having different polarity (see FIGS. 3a and 3b).

In an alternative embodiment, the number of magnets is uneven, such as 3, 5, 7, 9, 11, 13, etc. The uneven number of permanent magnets of a reaction element from one end of said reaction element starts with a magnetic north pole and also ends with a magnetic north pole, but may as well start with a magnetic south pole and also end with a magnetic south pole. However, reaction elements on two adjacent carts still start and end with magnets having different polarity.

The one permanent magnet 7 and the opposite permanent magnet 8 both have a reduced dimension parallel with the transport direction compared to the other magnets 5 situated between the one permanent magnet 7 and the opposite permanent magnet 8. Thus, the one permanent magnet 7 and the opposite permanent magnet 8 have a reduced dimension compared to the dimension of the other magnets 5.

A magnet with one or more reduced dimensions will normally provide a reduced magnetic flux or magnetic field when compared to e.g. a cubic magnet with non-reduced dimensions being magnified to the same extend and having the same material characteristics as the magnet with the reduced dimensions.

Figure 3A:
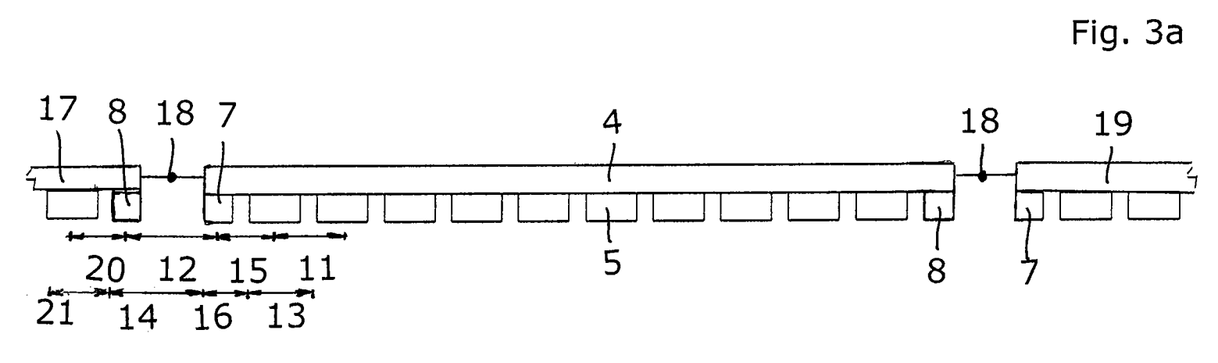
FIGS. 3a and 3b shows a simplified representation of reaction elements of the one embodiment on adjacent carts seen in a side view and from below, respectively.
Figure 3B:
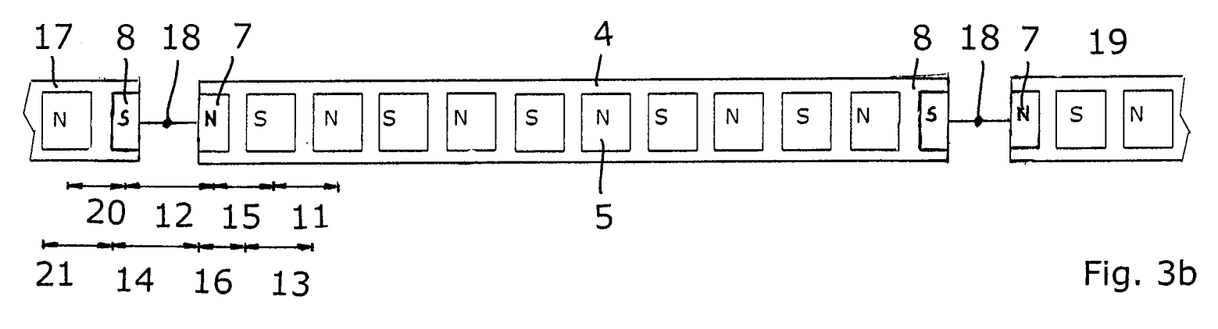

FIGS. 3a and 3b illustrate three consecutive magnetic reaction elements 4, 17 and 19 belonging to three consecutive carts. Linking means 18 are indicated just to illustrate that the carts are connected. The linking means 18 would normally not connect the carts by connecting the reaction elements, but instead connect one end of a cart with an end of an adjacent cart. The magnets 5 are arranged with a centre-to-centre pitch 11 from a centre of a magnetic filed of one magnet to a centre of a magnetic field of an adjacent magnet. In the embodiment shown, the centre of the magnetic field is the same as the geometrical centre of the magnet.

FIG. 3b illustrates the even number of permanent magnets on the reaction element 4 as starting with a magnetic north pole at the first magnet 7 and ending with a magnetic south pole at the last opposite magnet 8. The first magnet 7 on an adjacent reaction element 19 belonging to an adjacent cart has a different polarity as the last magnet 8 on the reaction element 4.

In the embodiment shown, the first magnet 7 and the last magnet 8 of the reaction element 4 of each cart have a different shape, which in the embodiment shown is a reduced dimension parallel with the transport direction, compared to the dimension parallel with the transport direction of the other magnets 5 of the reaction element 4. Thereby, the first magnet 7 and the last magnet 8 of the reaction element of each cart together with the other magnets of the reaction element 4 form a row of magnets with alternating polarity, but with a reduced dimension of the magnets 7, 8 at the ends of the reaction element 4.

FIG. 3b also illustrates a centre-to-centre pitch 12 from one magnet 7 on one reaction element to another magnet 8 on a neighbouring reaction element, and vice versa, being enlarged compared to a centre-to-centre pitch 11 from magnet to magnet of the other magnets 5 of each reaction element. The enlarged centre-to-centre pitch 12 is provided in the row of magnets at the transition between the carts by the position indicated by the linking means 18.

Furthermore, a side-to-side pitch 14 from one side of one magnet 7 on one reaction element to a corresponding side of another magnet 8 on a neighbouring reaction element, and vice versa, is also enlarged compared to a side-to-side pitch 13 from magnet to magnet of the other magnets 5 on each reaction element. The enlarged side-to-side pitch 14 is also provided in the row of magnets at the transition between the carts by the position indicated by the linking means 18.

Accordingly, a centre-to-centre pitch 15 from the first magnet 7 of a reaction element to an adjacent magnet 5 on the same reaction element, as seen from left to right, is reduced compared to the centre-to-centre pitch 11 and the side-to-side pitch 13, respectively, from magnet to magnet of the other magnets 5 on the same reaction element.

Also, a side-to-side pitch 16 from the first magnet 7 of a reaction element to an adjacent magnet 5 on the same reaction element, as seen from left to right, is reduced compared to the centre-to-centre pitch 11 from magnet to magnet of the other magnets 5 on the same reaction element.

Even also, the centre-to-centre pitch 20 between the last magnet 8 of a reaction element and an adjacent magnet 5 on the same reaction element, as seen from left to right, is reduced compared to the centre-to-centre pitch 11 from magnet to magnet of the other magnets 5 on the same reaction element.

However, a side-to-side pitch 21 from the last magnet 8 of a reaction element and an adjacent magnet 5 on the same reaction element, as seen from left to right, is equal to the centre-to-centre pitch 11 from magnet to magnet of the other magnets 5 on the same reaction element.

Thus, the reduced dimension is obtained by the first magnet 7 and the last magnet 8 each reaction element 4, 17, 19 having a reduced dimension parallel with the transport direction, and also by the centre-to-centre pitch 12 being enlarged, and even also by the side-to-side pitch 14 being enlarged, between the first magnet 7 on one reaction element 4, 17, 19 of one cart and the last magnet 8 on a neighbouring reaction element 4, 17, 19 of a neighbouring cart. As a result thereof, a maximum number of coils in the stator (not shown) and/or a maximum surface area of stator poles facing the magnets 5, 7, 8 may thereby be active at the same time to interact with all of the magnets.

Figure 4:
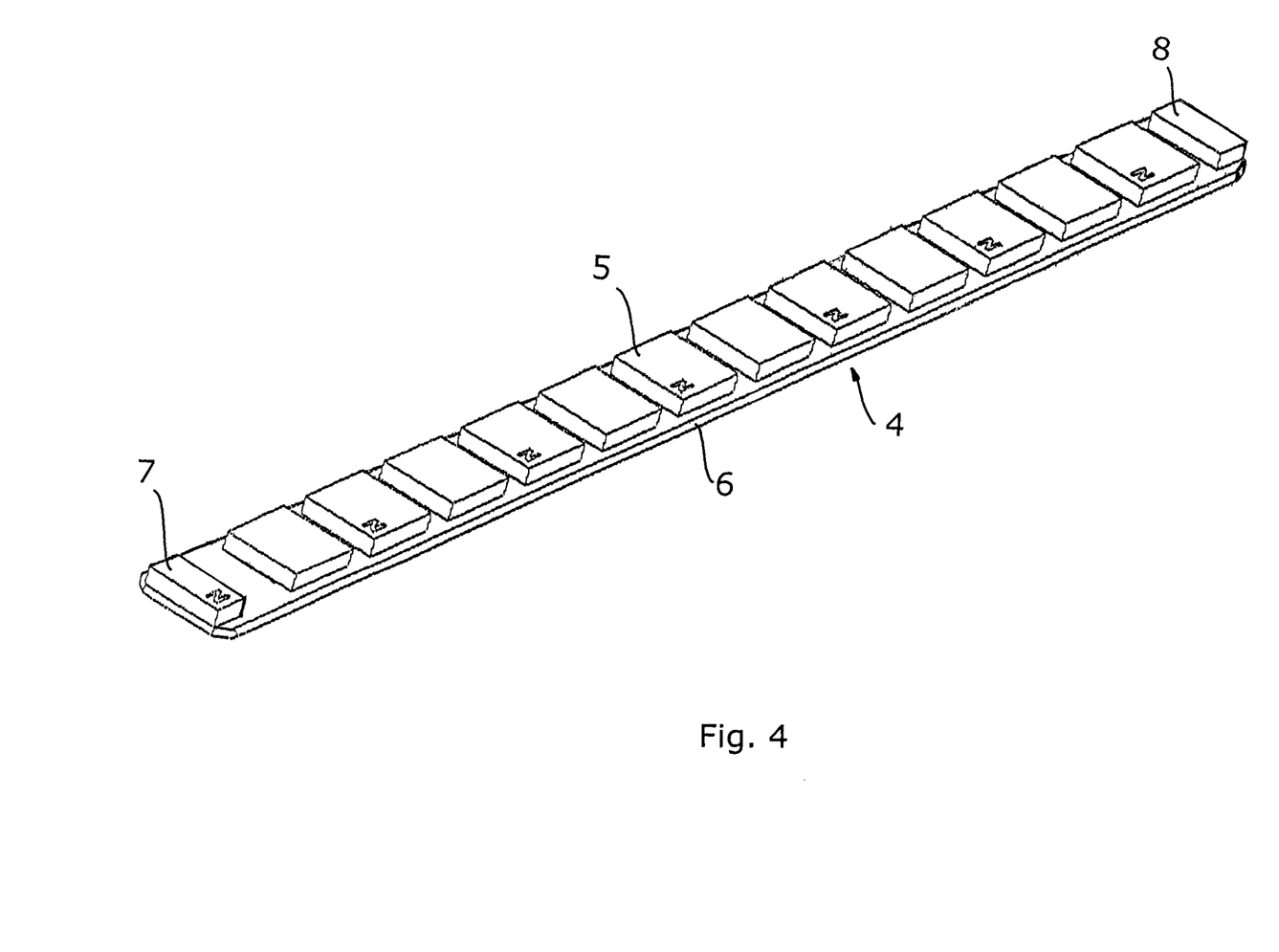
FIG. 4 shows a reaction element according to one embodiment of the invention

FIG. 4 illustrates a reaction element 4 according to a second embodiment of the invention. The reaction element 4 comprises a plate-like carrier 6 on which a plurality of permanent magnets 5, 7, 8 is fixed. The plate 6 may be divided into sections for easier handling, or so as to divide the reaction element into modules. The permanent magnets 5, 7, 8 are arranged with alternating polarity. The permanent magnet 7 in one end of the reaction element 4 has a magnetic north pole facing upwards, and the permanent magnet 8 in the opposite end of the reaction element 4 has a magnetic south pole facing upwards.

The number of magnets is even, such as 4, 6, 8, 10, 12, 14, etc. The even number of permanent magnets of a reaction element from one end of said reaction element starts with a magnetic north pole and ends with a magnetic south pole, but may as well start with a magnetic south pole and end with a magnetic north pole. Reaction elements on two adjacent carts start and end with magnets having different polarity (see FIGS. 5a and 5b).

In an alternative embodiment, the number of magnets is uneven, such as 3, 5, 7, 9, 11, 13, etc. The uneven number of permanent magnets of a reaction element from one end of said reaction element starts with a magnetic north pole and also ends with a magnetic north pole, but may as well start with a magnetic south pole and also end with a magnetic south pole. However, reaction elements on two adjacent carts still start and end with magnets having different polarity.

The one permanent magnet 7 and the opposite permanent magnet 8 both have a reduced dimension parallel with the transport direction, thus having a reduced dimension, compared to the dimension parallel with the transport direction, and thus compared to the dimension, of the other magnets 5 situated between the one permanent magnet 7 and the opposite permanent magnet 8.

Figure 5A:
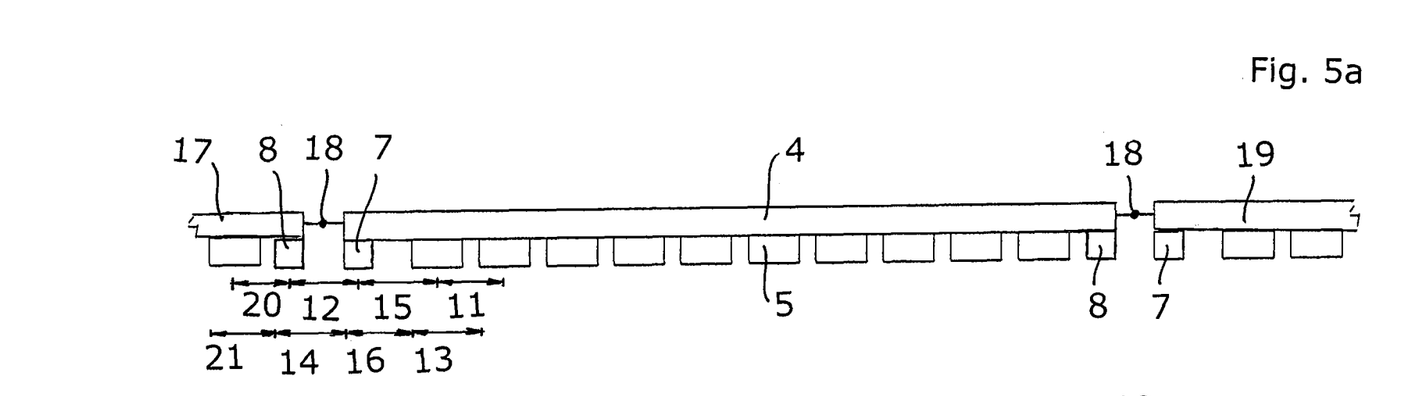
FIGS. 5a and 5b shows a simplified representation of reaction elements of the one embodiment on adjacent carts seen in a side view and from below, respectively.
Figure 5B:
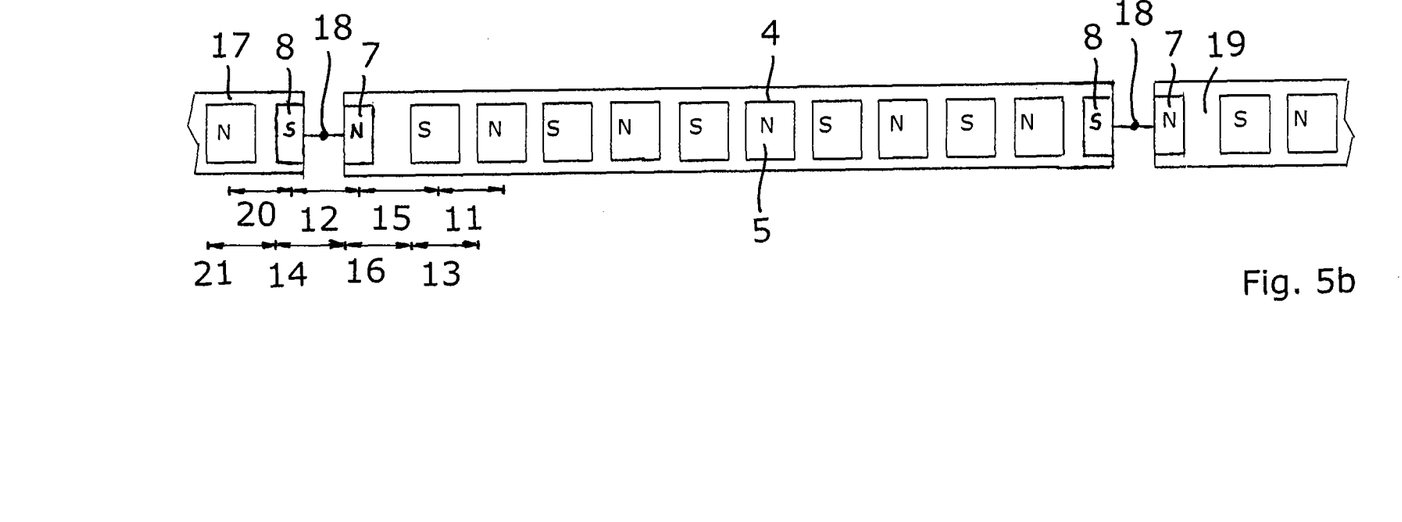

FIGS. 5a and 5b illustrate three consecutive magnetic reaction elements 4, 17 and 19 belonging to three consecutive carts. Linking means 18 are indicated just to illustrate that the carts are connected. The linking means 18 would normally not connect the carts by connecting the reaction elements, but instead connect one end of a cart with an end of an adjacent cart. The magnets 5 are arranged with a centre-to-centre pitch 11 from a centre of a magnetic filed of one magnet to a centre of a magnetic field of an adjacent magnet. In the embodiment shown, the centre of the magnetic field is the same as the geometrical centre of the magnet.

FIG. 5b illustrates the even number of permanent magnets on the reaction element 4 as starting with a magnetic north pole at the first magnet 7 and ending with a magnetic south pole at the last opposite magnet 8. The first magnet 7 on an adjacent reaction element 19 belonging to an adjacent cart has a different polarity as the last magnet 8 on the reaction element 4.

In the embodiment shown, the first magnet 7 and the last magnet 8 of the reaction element 4 of each cart have a different shape, which in the embodiment shown is a reduced dimension parallel with the transport direction, compared to the dimension parallel with the transport direction of the other magnets 5 of the reaction element 4. Thereby, the first magnet 7 and the last magnet 8 of the reaction element of each cart together with the other magnets of the reaction element 4 form a row of magnets with alternating polarity, but with a reduced dimension of the magnets 7, 8 at the ends of the reaction element 4.

FIG. 5b also illustrates a centre-to-centre pitch 12 from one magnet 7 on one reaction element to another magnet 8 on a neighbouring reaction element, and vice versa, being equal to the centre-to-centre pitch 11 from magnet to magnet of the other magnets 5 of each reaction element. The equal centre-to-centre pitch 12 is provided in the row of magnets at the transition between the carts by the position indicated by the linking means 18.

However, a side-to-side pitch 14 from one side of one magnet 7 on one reaction element to a corresponding side of another magnet 8 on a neighbouring reaction element, and vice versa, is equal to the side-to-side pitch 13 from magnet to magnet of the other magnets 5 of the reaction element. The equal side-to-side pitch 14 is also provided in the row of magnets at the transition between the carts by the position indicated the linking means 18.

Accordingly, a centre-to-centre pitch 15 from the first magnet 7 of a reaction element to an adjacent magnet 5 on the same reaction element, as seen from left to right, is enlarged compared to the centre-to-centre pitch 11 from magnet to magnet of the other magnets 5 on the same reaction element.

However, a side-to-side pitch 16 from the first magnet 7 of a reaction element to an adjacent magnet 5 on the same reaction element, as seen from left to right, is equal to the centre-to-centre pitch 11 from magnet to magnet of the other magnets 5 on the same reaction element.

Also, the centre-to-centre pitch 20 between the last magnet 8 of a reaction element and an adjacent magnet 5 on the same reaction element, as seen from left to right, is reduced compared to the centre-to-centre pitch 11 from magnet to magnet of the other magnets 5 on the same reaction element.

However, a side-to-side pitch 21 from the last magnet 8 of a reaction element and an adjacent magnet 5 on the same reaction element, as seen from left to right, is equal to the centre-to-centre pitch 11 from magnet to magnet of the other magnets 5 on the same reaction element.

Thus, the reduced dimension is obtained primarily by the first magnet 7 and the last magnet 8 each reaction element 4, 17, 19 having a reduced dimension parallel with the transport direction, and secondarily by the centre-to-centre pitch 12 being equal between the first magnet 7 on the reaction element and an adjacent magnet 5 on the same reaction element. As a result thereof, a maximum number of coils in the stator (not shown) and/or a maximum surface area of stator poles facing the magnets 5, 7, 8 may thereby be active at the same time to interact with all of the magnets.

Figure 6:
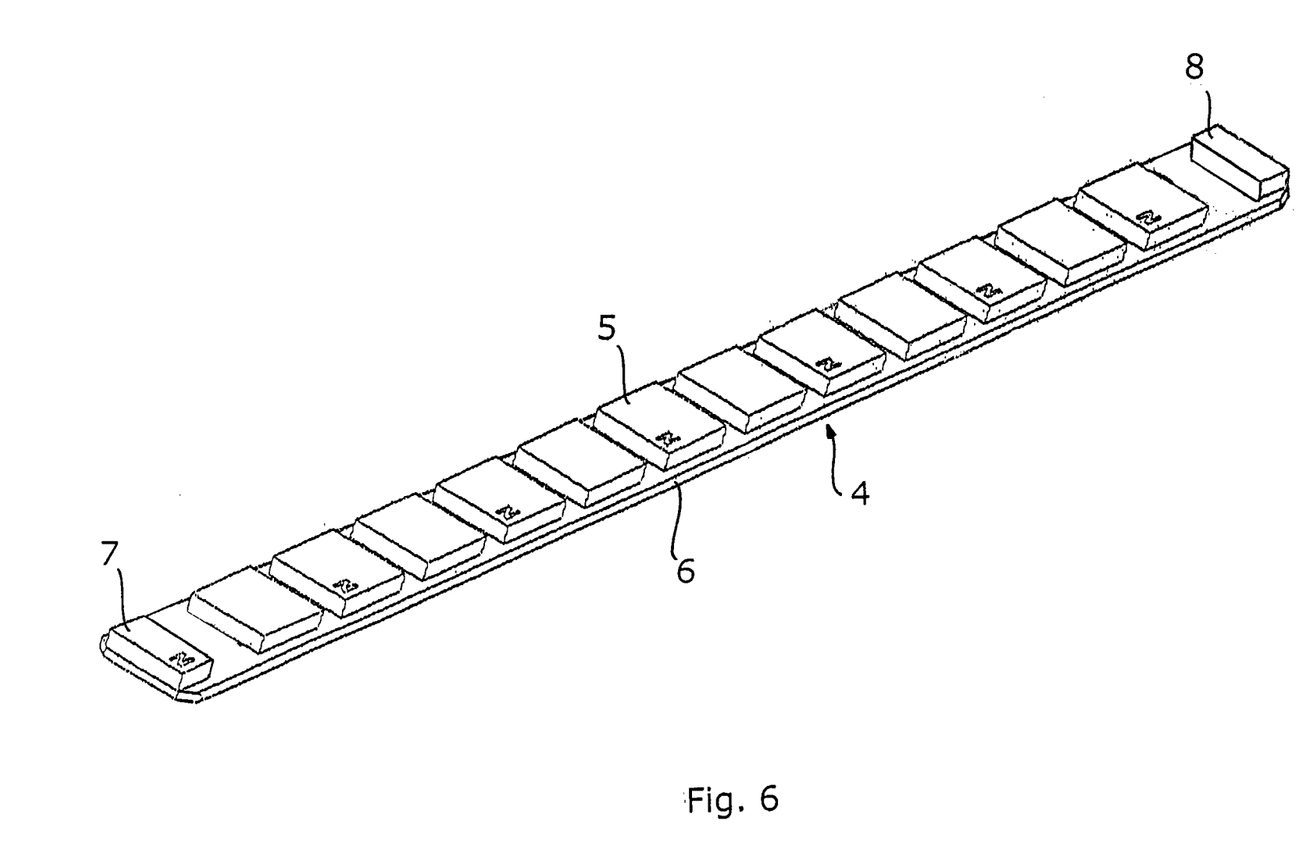
FIG. 6 shows a reaction element according to one embodiment of the invention

FIG. 6 illustrates a reaction element 4 according to one embodiment of the invention. The reaction element 4 comprises a plate-like carrier 6 on which a plurality of permanent magnets 5, 7, 8 is fixed. The plate 6 may be divided into sections for easier handling, or so as to divide the reaction element into modules. The permanent magnets 5, 7, 8 are arranged with alternating polarity. The permanent magnet 7 in one end of the reaction element 4 has a magnetic north pole facing upwards, and the permanent magnet 8 in the opposite end of the reaction element 4 has a magnetic south pole facing upwards.

The number of magnets is even, such as 4, 6, 8, 10, 12, 14, etc. The even number of permanent magnets of a reaction element from one end of said reaction element starts with a magnetic north pole and ends with a magnetic south pole, but may as well start with a magnetic south pole and end with a magnetic north pole. Reaction elements on two adjacent carts start and end with magnets having different polarity (see FIGS. 7a and 7b).

In an alternative embodiment, the number of magnets is uneven, such as 3, 5, 7, 9, 11, 13, etc. The uneven number of permanent magnets of a reaction element from one end of said reaction element starts with a magnetic north pole and also ends with a magnetic north pole, but may as well start with a magnetic south pole and also end with a magnetic south pole. However, reaction elements on two adjacent carts still start and end with magnets having different polarity.

The one permanent magnet 7 and the opposite permanent magnet 8 both have a reduced dimension parallel with the transport direction, thus having a reduced dimension, compared to the dimension parallel with the transport direction, and thus compared to the dimension, of the other magnets 5 situated between the one permanent magnet 7 and the opposite permanent magnet 8.

Figure 7A:
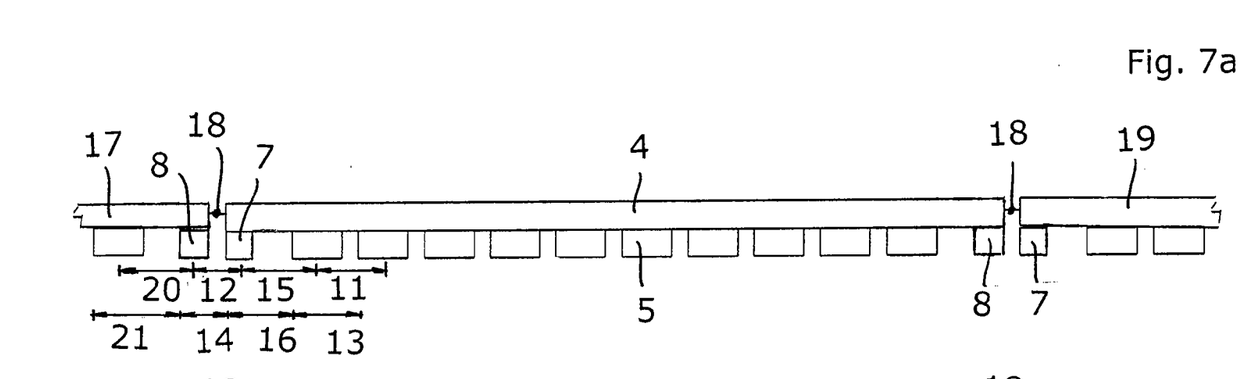
FIGS. 7a and 7b shows a simplified representation of reaction elements of the one embodiment on adjacent carts seen in a side view and from below, respectively.
Figure 7B:
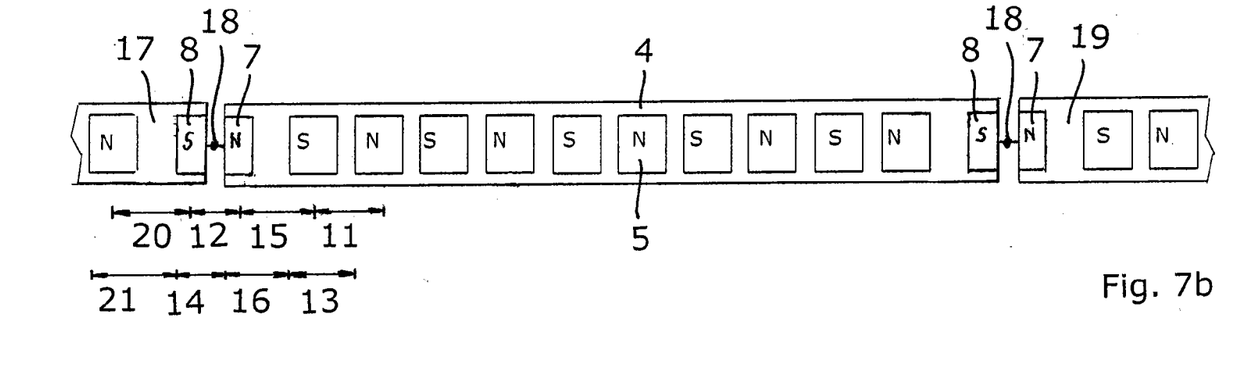

FIGS. 7a and 7b illustrate three consecutive magnetic reaction elements 4, 17 and 19 belonging to three consecutive carts. Linking means 18 are indicated just to illustrate that the carts are connected. The linking means 18 would normally not connect the carts by connecting the reaction elements, but instead connect one end of a cart with an end of an adjacent cart. The magnets 5 are arranged with a centre-to-centre pitch 11 from a centre of a magnetic filed of one magnet to a centre of a magnetic field of an adjacent magnet. In the embodiment shown, the centre of the magnetic field is the same as the geometrical centre of the magnet.

FIG. 7b illustrates the even number of permanent magnets on the reaction element 4 as starting with a magnetic north pole at the first magnet 7 and ending with a magnetic south pole at the last opposite magnet 8. The first magnet 7 on an adjacent reaction element 19 belonging to an adjacent cart has a different polarity as the last magnet 8 on the reaction element 4.

In the embodiment shown, the first magnet 7 and the last magnet 8 of the reaction element 4 of each cart have a different shape, which in the embodiment shown is a reduced dimension parallel with the transport direction, compared to the dimension parallel with the transport direction of the other magnets 5 of the reaction element 4. Thereby, the first magnet 7 and the last magnet 8 of the reaction element of each cart together with the other magnets 5 of the reaction element 4 form a row of magnets with alternating polarity, but with a reduced dimension of the magnets 7,8 at the ends of the reaction element 4.

FIG. 7b also illustrates a centre-to-centre pitch 12 from one magnet 7 on one reaction element to another magnet 8 on a neighbouring reaction element, and vice versa, being reduced compared to the centre-to-centre pitch 11 from magnet to magnet of the other magnets 5 of each reaction element. The reduced centre-to-centre pitch 12 is provided in the row of magnets at the transition between the carts by the position indicated by the linking means 18.

Furthermore, a side-to-side pitch 14 from one side of one magnet 7 on one reaction element to a corresponding side of another magnet 8 on a neighbouring reaction element, and vice versa, is also reduced compared to a side-to-side pitch 13 from magnet to magnet of the other magnets 5 on the reaction element. The reduced side-to-side pitch 14 is also provided in the row of magnets at the transition between the carts by the position indicated by the linking means 18.

Accordingly, a centre-to-centre pitch 15 between the first magnet 7 of a reaction element to an adjacent magnet 5 on the same reaction element, as seen from left to right, is enlarged compared to the centre-to-centre pitch 11 from magnet to magnet of the other magnets 5 on the same reaction element.

However, a side-to-side pitch 16 from the first magnet 7 of a reaction element to an adjacent magnet 5 on the same reaction element, as seen from left to right, is equal to the side-to-side pitch 13 from magnet to magnet of the other magnets 5 on the same reaction element.

Also, the centre-to-centre pitch 20 from the last magnet 8 of a reaction element to an adjacent magnet 5 on the same reaction element, as seen from left to right, is increased compared to the centre-to-centre pitch 11 from magnet to magnet of the other magnets 5 on the same reaction element.

Even also, a side-to-side pitch 21 from the last magnet 8 of a reaction element to an adjacent magnet 5 on the same reaction element, as seen from left to right, is increased compared to the side-to-side pitch 13 from magnet to magnet of the other magnets 5 on the same reaction element.

Thus, the reduced dimension is primarily obtained by the first magnet 7 and the last magnet 8 each reaction element 4, 17, 19 having a reduced dimension parallel with the transport direction, and secondarily by the centre-to-centre pitch 15 and 20 being enlarged between the first magnet 7 on a reaction element and an adjacent magnet 5 on the same reaction element and between the last magnet 8 on a reaction element and an adjacent magnet 5 on the same reaction element. As a result thereof, a maximum number of coils in the stator (not shown) and/or a maximum surface area of stator poles facing the magnets 5, 7, 8 may thereby be active at the same time to interact with all of the magnets.

In a preferred embodiment of the system the magnets on the reaction elements are arranged with a side-to-side pitch 13 from magnet to magnet of 50 millimeters. This pitch is particularly suitable for use with a sorter system, because the pitch of the carts is usually a plurality of hundreds of millimeters which is conveniently divided by 25 or by 50, possibly by 75 if the plurality of hundreds is three hundred millimeters or a plurality of three hundred millimeters, and results in a natural number. Another preferred embodiment involves that a surface of the permanent magnets, which is facing the stators, is substantially quadratic. The surface of the permanent magnets has an extent of either from zero to and including 25 millimeters, or from 35 to and including 50 millimeters, or from 50 to and including 75 millimeters or from 75 to and including 100 millimeters, in a longitudinal direction of the cart.

The reaction elements 4, 17, 19 are attached to the carts. The plate-like carrier 6 may be arranged in a horizontal position on the carts and at least one stationary stator (not shown) may be arranged to interact with the reaction elements from a position below the reaction elements when the stator and reaction elements are interacting to propel the carts. Alternatively, the carrier 6 may be arranged in a vertical position on the carts. One or more stationary stators (not shown) may be arranged to interact with the reaction elements from positions situated sideways to said reaction elements when the stators and the reaction elements are interacting. Preferably, the stators are arranged in pairs acting from opposite sides in order to counterbalance forces induced on the reaction elements.

The cart to cart pitch of consecutive carts is preferably a natural number of hundreds of millimeters, such as 100, 200, 300, 400, 500, 600, 700, 800, 900, 1000, 1100, 1200, 1300, 1400, 1500, 1600, 1700, 1800, 1900 and/or 2000 millimeters. When the magnet to magnet pitch 13 is selected as 50 millimeters and the cart to cart pitch is chosen as a natural number of hundreds of millimeters this combination may always result in an even number of permanent magnets on each reaction element, which suits the entire length of the cart whereby two adjacent carts can have reaction elements with magnets 5 forming a row of magnets with alternating polarity and constant pitch from magnet to magnet, where the row has a reduced dimension of the magnets 7,8 at the transition between the adjacent carts.

The reduced dimension may be obtained by reducing the dimension of at least one of the first and last magnets 7, 8, preferably by reducing the dimension of both the first and last magnet, of a reaction element 4, 17, 19 on each cart.

The reduced dimension may alternatively be obtained by enlarging the magnetic centre-to-centre pitch 12 between a first magnet 7 of a reaction element of one cart and a last magnet 8 of a reaction element of a neighbouring cart.

The reduced dimension may alternatively be obtained by enlarging the magnetic centre-to-centre pitch 15 between a first magnet 7 on a reaction element and an adjacent magnet 5 on the same reaction element and/or by enlarging the magnetic centre-to-centre pitch 20 between a last magnet 8 on a reaction element and an adjacent magnet 5 on the same reaction element.

Finally, the reduced dimension may be obtained by any combination of any of the above features, i.e. any combination of changing the centre-to-centre pitch 12 between the first magnet 7 and the last magnet 8 of neighbouring carts, changing the centre-to-centre pitch 15 and or the centre-to-centre pitch 20 between the first magnet and/or the last magnet and an adjacent magnet 5, respectively.

When the magnets on reaction elements on adjacent or consecutive carts have identically alternating polarities, i.e. either starting with a magnetic north pole and ending with a magnetic south pole, or starting with a magnetic south pole and ending with a magnetic north pole, the magnets may be arranged to form a continuing row of alternating polarities, said row having a reduced dimension of the magnets 7,8 at the transition between the adjacent carts.

The result is that the carts may be identical or even have a different cart to cart pitch 14, because the dimension parallel with the transport direction and/or the shape and/or the relative position of a first magnet 7 and a last magnet 8 on the reaction element is different than the dimension parallel with the transport direction, shape or relative position of other magnets of the reaction element.

FIG. 8-11 display different embodiments of reaction elements 4 including a carrier 6 and permanent magnets 5 arranged with alternating polarity.

Figure 8:
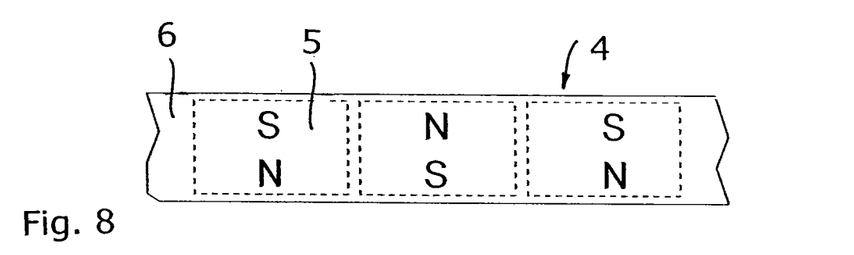
FIG. 8-11 show different embodiments of magnet positions on reaction elements

FIG. 8 displays a variant where the magnets 5 are embedded in the carrier 6. The carrier 6 may be of plastic and the magnets embedded by casting the plastic around the magnets. Or the carrier 6 may be of aluminium where suitable recesses have been provided for receiving the magnets 5, which may be fastened with glue, or with mechanic fastening means.

Figure 9:
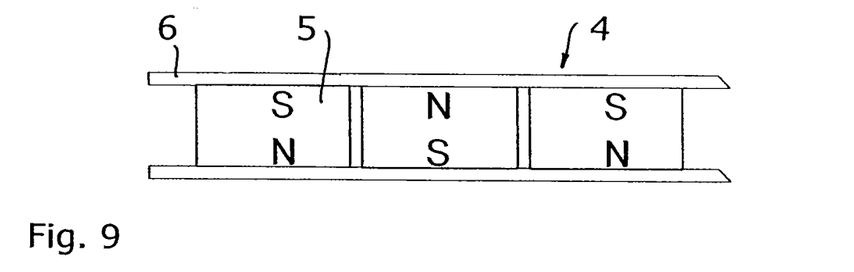

FIG. 9 displays a variant where the magnets 5 are fastened with glue between two thin plates of non-ferromagnetic material, e.g. aluminium.

Figure 10:
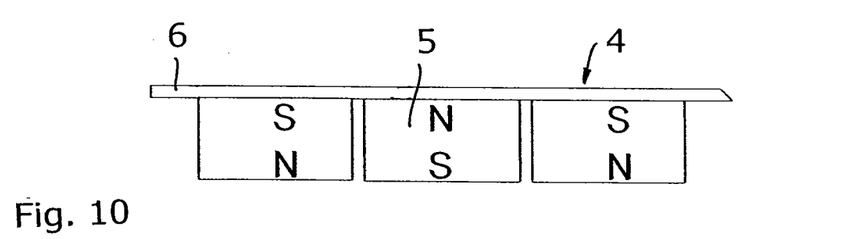

FIG. 10 displays a variant corresponding to FIG. 2 where the magnets 5 are attached to a carrier 6, where the carrier is a ferromagnetic plate.

Figure 11:
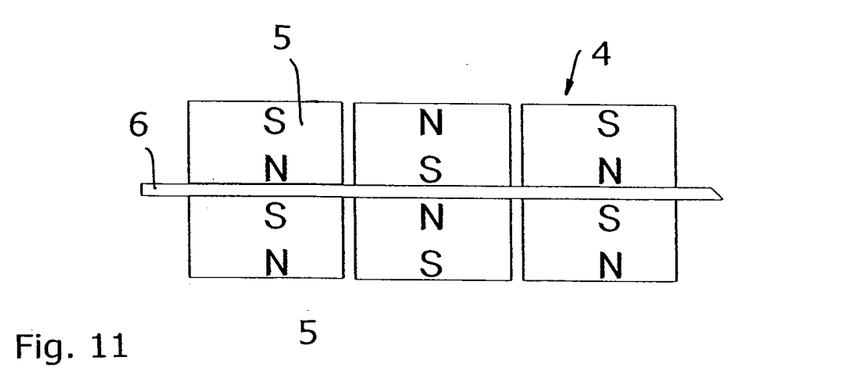

FIG. 11 displays a variant, where the carrier 6 is a ferromagnetic plate which has magnets 5 attached on both sides.

The reaction elements shown in FIG. 8-11 may be used in more ways. One way involves that the reaction elements are arranged with the plate-like carrier in a horizontal position on the carts, i.e. that the figures are regarded as the reaction elements are viewed from the side and a not shown stationary stator is arranged to interact with the reaction elements from a position below the reaction elements. A plane going through the not shown stator and a reaction element 4 will then be essentially vertical. Another way involves that the plate-like carrier 6 is arranged in a vertical position on the carts, i.e. that the figures are regarded as the reaction elements 4 are viewed from above and a not shown stationary stator is arranged to interact with the reaction elements from a position at one side of the reaction elements. A plane through the not shown stator and a reaction element will in that situation be essentially horizontal. In this situation may the reaction elements 4 shown in FIGS. 4 and 5 also be interacting with two not shown stators which are placed on opposite sides of the reaction elements 4, i.e. such that both stators and a reaction element will lie in a same horizontal plane.

The embodiment of a reaction element 4 shown in FIG. 11 is to be viewed as the plate-like carrier 6 is arranged in a vertical position on the carts, i.e. that the figure is regarded as the reaction element 4 is viewed from above and that two not shown stationary stators will be arranged to interact with the reaction element from positions on each side of the reaction element. A plane through the not shown stators and the reaction element will in that situation be essentially horizontal.

Figure 12A:
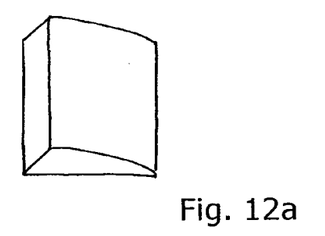
Figure 12B:
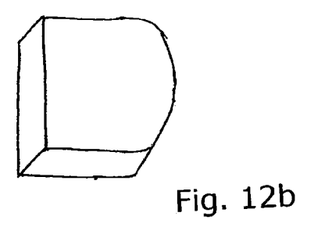

FIG. 12*a* shows an embodiment of a magnet having a reduced dimension, the reduced dimension being obtained by an oval curvature along at least part of the entire surface of the magnet. FIG. 12*b* shows another embodiment of a magnet having a reduced dimension, the reduced dimension being obtained by an oval curvature along at least part of the circumference of the magnet.

Figure 13A:
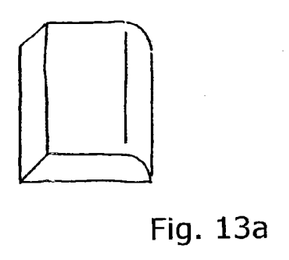
Figure 13B:
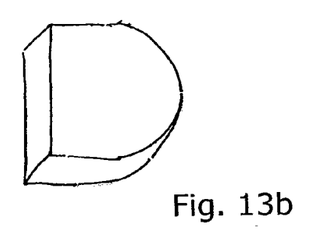

FIG. 13*a* shows another embodiment of a magnet having a reduced dimension, the reduced dimension being obtained by an at least partly circular curvature along at least part of the entire surface of the magnet. FIG. 13*b* shows another embodiment of a magnet having a reduced dimension, the reduced dimension being obtained by an at least partly circular, such as a semi-circular curvature, along at least part of a circumference of the magnet.

Figure 14A:
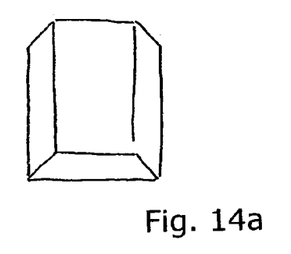
Figure 14B:
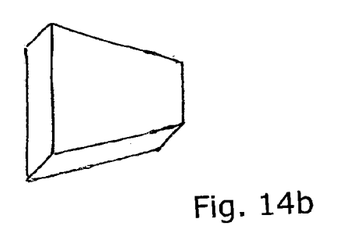

FIG. 14*a* shows another embodiment of a magnet having a reduced dimension, the reduced dimension being obtained by a tapering shape along at least part of the entire surface of the magnet. FIG. 14*b* shows another embodiment of a magnet having a reduced dimension, the reduced dimension being obtained by a tapering shape along at least part of a circumference of the magnet.

Figure 15A:
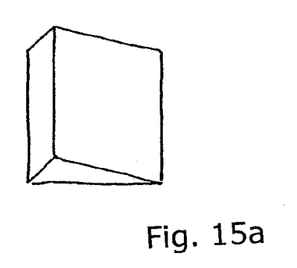
Figure 15B:
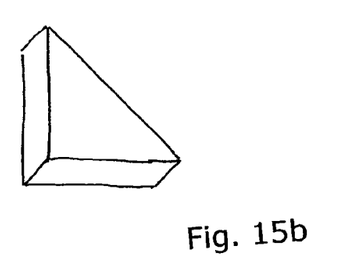

FIG. 15*a* shows another embodiment of a magnet having a reduced dimension, the reduced dimension being obtained by a wedge-like shape along at least part of the entire surface of the magnet. FIG. 15*b* shows another embodiment of a magnet having a reduced dimension, the reduced dimension being obtained by a wedge-like shape along at least part of a circumference of the magnet.

Figure 16A:
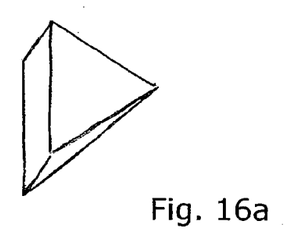
Figure 16B:
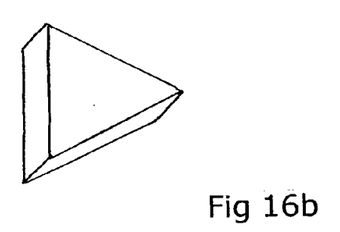

FIG. 16*a* shows another embodiment of a magnet having a reduced dimension, the reduced dimension being obtained by a point-like shape along at least part of the entire surface of the magnet. FIG. 16*b* shows another embodiment of a magnet having a reduced dimension, the reduced dimension being obtained by a point-like shape along at least part of a circumference of the magnet.

In the embodiments shown in FIGS. 12*b*, 13*b*, 14*b*, 15*b* and 16*b*, the reduced dimension is a reduced dimension only by reducing the dimension seen parallel to the transport direction of the carts, which transport direction is from left to right in the plane of the drawings, resulting in the transverse dimension of the magnets as seen upwards and downwards in the plane of the drawings being reduced along at least part of the left-to-right extension of the magnets.

In the embodiments shown in FIG. 12*a*, 13*a*, 14*a*, 15*a*, the reduced dimension is a reduced dimension only by reducing the dimension seen on the on the skew to the transport direction of the carts, which transport direction is from left to right in the plane of the drawings, resulting in the transverse dimension of the magnets as seen inwards and outwards in the plane of the drawings being reduced along at least part of the left-to-right extension of the magnets.

In other embodiments such as the one shown in FIG. 16*a*, the reduced dimension may be obtained by reducing the dimension both in a direction parallel to the transport direction and also by reducing the dimension in a direction being skew to the transport direction of the carts, which transport direction is from left to right in the plane of the drawings, resulting in the transverse dimensions of the magnets both as seen inwards and downwards and when seen inwards and outwards in the plane of the drawings being reduced along at least part of the left-to-right extension of the magnets.

Although the present invention has been described in connection with the specified embodiments of the reaction element and of the magnets, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. Furthermore, individual features mentioned in different claims, may possibly be advantageously combined, and the mentioning of these features in different claims does not exclude that a combination of features is not possible and advantageous.

The invention claimed is:

1. A sorting system including a conveyor comprising a plurality of carts for carrying articles, a track along which the carts may be driven, a propulsion system for providing a driving force to the carts for moving the carts along the track, said propulsion system comprising at least one stationary stator having a plurality of coils arranged to generate magnetic fields when electrical power is applied, and reaction elements each respectively mounted on each of the carts, said reaction elements each comprising a plurality of permanent magnets connected to at least one plate-like carrier, and said reaction elements being arranged on the carts in order to interact with the magnetic fields generated by the coils of the stator, as well as a controller for controlling a supply of electrical power to the stator in order to provide a driving force via the reaction elements to the carts when power is applied, where the reaction elements each comprises a number of permanent magnets arranged with alternating polarity, and where the magnets on reaction elements of two adjacent carts are arranged to form a longitudinal row of magnets as seen in a transport direction of the carts, said row having two neighbouring magnets, at least one of said two magnets having, in the transport direction, a reduced dimension compared to other magnets of the reaction element, said two neighbouring magnets being located at each side of a transition between said two adjacent carts.

2. The sorting system according to claim 1, where both said at least two neighbouring magnets, in the transport direction, have a reduced dimension compared to other magnets of the reaction element.

3. The sorting system according to claim 1, where the reduced dimension is present only in the transport direction, not in a direction transverse to the transport direction.

4. The sorting system according to claim 1, where the reduced dimension is present both in the transport direction and in a direction transverse to the transport direction.

5. The sorting system according to claim 1, where the at least one of the two neighbouring magnets, in the transport direction, has a smaller rectangular shape compared to the other magnets having a relatively larger rectangular shape.

6. The sorting system according to claim 1, where the at least one of the two neighbouring magnets, in the transport direction, has an at least partly oval shape along at least a part of the magnet, said at least partly oval shape facing the other of the two neighbouring magnets.

7. The sorting system according to claim 1, where the at least one magnet of the two neighbouring magnets, in the transport direction, has a semi-circular disc shape along at least a part of the magnet, said semi-circular disc shape facing the other of the two neighbouring magnets.

8. The sorting system according to claim 1, where the at least one of the two neighbouring magnets, in the transport direction, has an at least partly tapering shape along at least a part of the magnet, said at least partly tapering shape facing the other of the two neighbouring magnets.

9. The sorting system according to claim 1, where the at least one of the two neighbouring magnets, in the transport direction, has a wedge-like shape along at least a part of the magnet, said wedge-like shape facing the other of the two neighbouring magnets.

10. The sorting system according to claim 1, where the at least one of the two neighbouring magnets, in the transport direction, has a point-like shape along at least a part of the magnet, said point-like shape facing the other of the two neighbouring magnets.

11. The sorting system according to claim 1, where the number of permanent magnets arranged with alternating polarity is an even number, and where the two neighbouring magnets having a reduced dimension have a different polarity.

12. The sorting system according to claim 1, where the number of permanent magnets arranged with alternating polarity is an uneven number, and where the two neighbouring magnets having a reduced dimension have a different polarity.

13. The sorting system according to claim 1, where each plate-like carrier is arranged in a horizontal position on the carts and the at least one stationary stator is arranged to interact with the reaction elements from a position below said reaction elements when the stator and reaction elements are interacting.

14. The sorting system according to claim 1, where each plate-like carrier is arranged in a vertical position on the carts and at least one stationary stator is arranged to interact with the reaction elements from a position situated sideways to said reaction elements when the stator and the reaction elements are interacting.

15. The sorting system according to claim 1, where each plate-like carrier is arranged in a vertical position on the carts and at least two stationary stators are arranged to interact with the reaction elements from opposite positions situated sideways to said reaction elements when the stators and the reaction elements are interacting.

16. The sorting system according to claim 1, where the plate-like carrier comprises ferromagnetic material which is arranged to lead a magnetic field from at least one permanent magnet to another permanent magnet.

17. The sorting system according to claim 1, where the surface of the permanent magnets has an extent within one of the following intervals: from zero to and including 25 mm in the longitudinal direction of the cart, from 25 mm to and including 50 mm in a longitudinal direction of the cart, or from 50 mm to and including 75 mm in a longitudinal direction of the cart, or from 75 mm to and including 100 mm in a longitudinal direction of the cart.

18. The sorting system according to claim 1, where a cart to cart pitch of consecutive carts is a natural number of hundreds of millimeters.

19. The sorting system according to claim 1, where the pitch of consecutive carts is selected from a group comprising 100, 200, 300, 400, 500, 600, 700, 800, 900, 1000, 1100, 1200, 1300, 1400, 1500, 1600, 1700, 1800, 1900 and 2000 millimeters.

20. The sorting system according to claim 1, where the carts form an endless chain of carts.

21. The sorting system according to claim 1, where a plurality of stators are arranged along the track.

22. The sorting system according to claim 1, where the controller further comprises an encoder for determining a position and a speed of one or more carts, and the controller is operable to control the electrical power applied to the stator in response to the determined position and speed.

23. A cart for a sorting system comprising a frame structure, at least one magnetic reaction element comprising a plural number of permanent magnets mounted on a at least one plate-like carrier, where the cart comprises linking means for connection to another cart, and where the reaction element, when the cart is connected to an identical cart to form two adjacent carts, the magnets on the reaction elements of said two adjacent carts are forming a row of magnets having alternating polarity, said row having at least one magnet having a reduced dimension compared to other magnets of the reaction element.

24. The cart according to claim 23, where said row of magnets on said adjacent carts comprises at least two neighbouring magnets, in the transport direction, having a reduced dimension compared to other magnets of the reaction element.

25. The cart according to claim 23, where the reduced dimension is present only in the transport direction, not in a direction transverse to the transport direction.

26. The cart according to claim 23, where the reduced dimension is present both in the transport direction and in a direction transverse to the transport direction.

27. The cart according to claim 23, where the at least one of the two neighbouring magnets, in the transport direction, has a smaller rectangular shape compared to the other magnets having a relatively larger rectangular shape.

28. The cart according to claim 23, where the at least one of the two neighbouring magnets, in the transport direction, has an at least partly oval shape along at least a part of the magnet, said at least partly oval shape facing the other of the two neighbouring magnets.

29. The cart according to claim 23, where the at least one magnet of the two neighbouring magnets, in the transport direction, has a semi-circular disc shape along at least a part of the magnet, said semi-circular disc shape facing the other of the two neighbouring magnets.

30. The cart according to claim 23, where the at least one of the two neighbouring magnets, in the transport direction, has an at least partly tapering shape along at least a part of the magnet, said at least partly tapering shape facing the other of the two neighbouring magnets.

31. The cart according to claim 23, where the at least one of the two neighbouring magnets, in the transport direction, has a wedge-like shape along at least a part of the magnet, said wedge-like shape facing the other of the two neighbouring magnets.

32. The cart according to claim 23, where the at least one of the two neighbouring magnets, in the transport direction, has a point-like shape along at least a part of the magnet, said point-like shape facing the other of the two neighbouring magnets.

33. The cart according to claim 23, where the number of permanent magnets arranged with alternating polarity is an even number, and where the two neighbouring magnets having a reduced dimension have a different polarity.

34. The cart according to claim 23, where the number of permanent magnets arranged with alternating polarity is an uneven number, and where the two neighbouring magnets having a reduced dimension have a different polarity.

* * * * *